United States Patent [19]

Testa

[11] Patent Number: 5,023,157

[45] Date of Patent: Jun. 11, 1991

[54] METHOD FOR THE ILLUMINATION OF A COLOR TELEVISION MASK TUBE SCREEN, AND DEVICE FOR IMPLEMENTATION THEREOF

[75] Inventor: Perluigi Testa, Rome, Italy

[73] Assignee: Videocolor, Paris La Defense, France

[21] Appl. No.: 319,755

[22] Filed: Mar. 7, 1989

[30] Foreign Application Priority Data

Mar. 11, 1988 [FR] France .................................. 88 03188

[51] Int. Cl.$^5$ .............................................. H01M 8/04

[52] U.S. Cl. ......................................... 430/24; 430/25; 430/26; 430/396; 430/394; 354/1

[58] Field of Search ..................... 430/24, 25, 26, 396, 430/394

[56] References Cited

U.S. PATENT DOCUMENTS

| | | | |
|---|---|---|---|
| 4,418,279 | 11/1983 | Hager et al. | 250/566 |
| 4,590,137 | 5/1986 | D'Amato | 430/24 |
| 4,707,093 | 11/1987 | Testa | 354/1 |

FOREIGN PATENT DOCUMENTS 0206880 12/1986 European Pat. Off. .

*Primary Examiner*—Hoa Van Le

*Assistant Examiner*—Thomas R. Neville

*Attorney, Agent, or Firm*—Joseph S. Tripoli; Dennis H. Irlbeck

[57] ABSTRACT

The disclosure concerns the manufacture of mask type color television tubes. A diaphragm is used, for which the profile or aperture is modified during the operation for the uniform illumination of the vertical stripes of the screen during the different stages for the deposition of luminophors. The modification of the profile is obtained by the shifting of strips parallel to the vertical stripes.

5 Claims, 4 Drawing Sheets

FIG_2-a
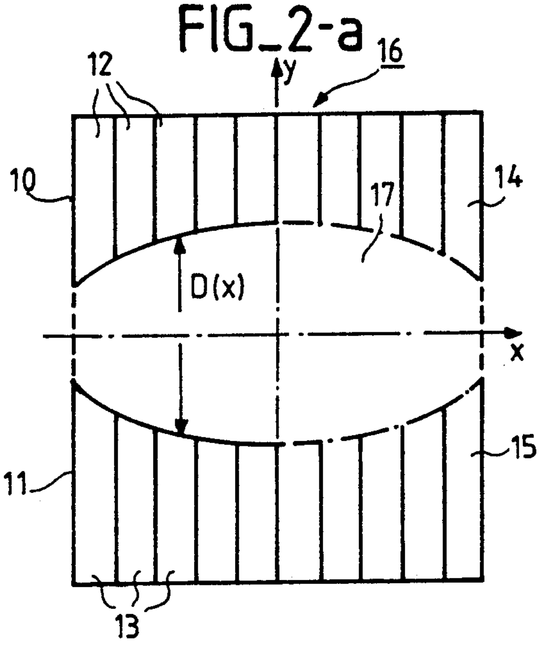
FIG_2-b
FIG_3-a
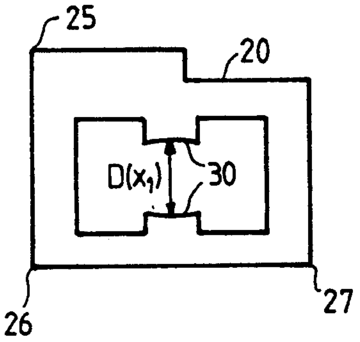
FIG_3-b
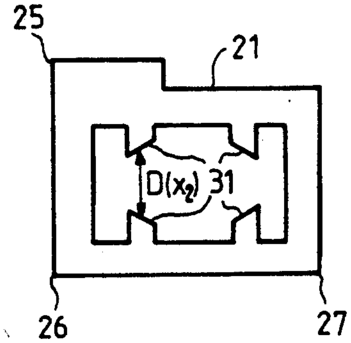
FIG_3-c
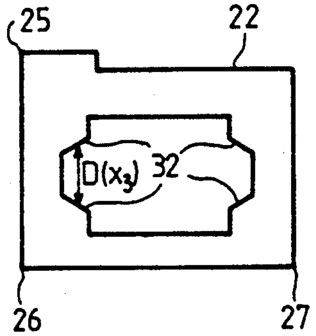
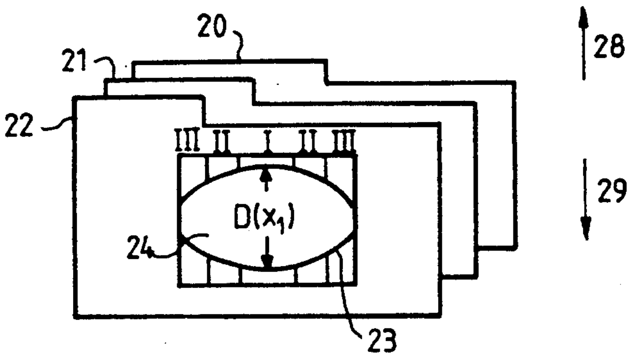
FIG_3-d FIG_4-a
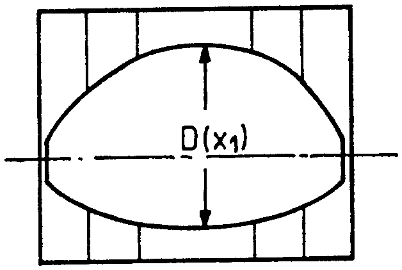
FIG_4-b
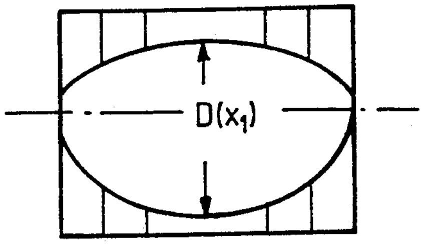
FIG_5-a
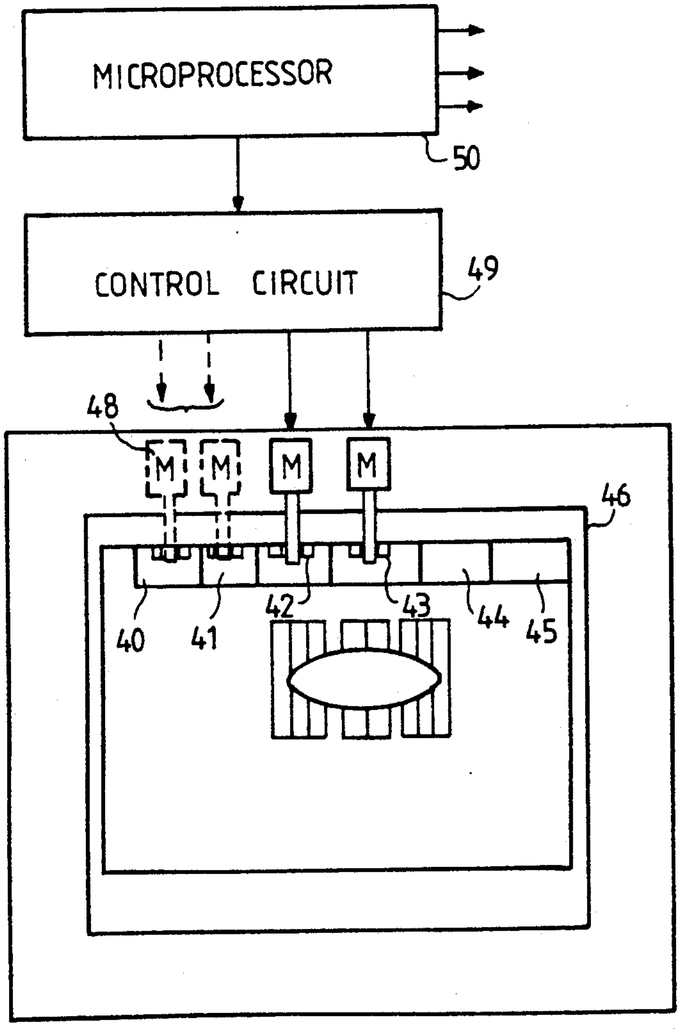
FIG_5-b
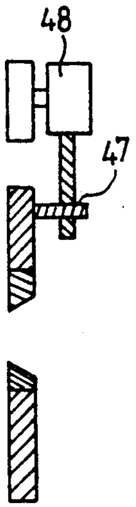

METHOD FOR THE ILLUMINATION OF A COLOR TELEVISION MASK TUBE SCREEN, AND DEVICE FOR IMPLEMENTATION THEREOF

BACKGROUND OF THE INVENTION

1. Field of the Invention

The invention relates to methods for the fabrication of mask type color television tubes and, more particularly, to optical systems used to illuminate the screens of these tubes during their manufacture. The invention also concerns a diaphragm for these optical systems.

2. Description of the Prior Art

A color television tube has (FIG. 1) a front envelope 1, on the internal face of which is deposited the screen. This screen is usually formed by vertical stripes such as those referenced 2, made of cathodoluminescent materials (luminophors) which, when excited by an electron beam produced by an electron gun, emit a red, green or blue light. The screen thus has a sequence of sets of three vertical stripes, each set having a red stripe, a green stripe and a blue stripe, and each stripe is excited by a corresponding electron beam. To make the electron beam intended for one color stripe, for example for the blue stripe, strike only the lumiphor which has to produce this color, there is provision for placing a perforated mask 3 before the screen. The position and arrangement of the openings (for example the elongated slits (4) of this perforated mask 3, in the vertical direction, ensure the selection of the colors in combination with the corresponding electron beam.

Since the position of the mask with reference to the screen has to be determined with precision, the mask 3 is used to make the screen. To this effect, it is fixed to the envelope 1 of the tube before the screen is formed. Each luminophor is then placed as follows: the internal face of the envelope is coated with a solution, containing the luminophor to be deposited and a photosensitive material which hardens when illuminated by ultra-violet (UV) radiation, or by a mixture of UV radiation and blue light. This solution is then illuminated by means of an optical system 5 which includes an UV radiation source 6 and a lens 7 with a diaphragm 8. The optical system 5 simulates the deflection of the electron beams of the tube. The position of the optical system 5, notably that of the UV lamp 6, depends on the color which it is sought to obtain on the screen so as to create the sequence of red, blue and green vertical stripes. Of course, to each position of the optical system, there corresponds a earlier deposition of a determined solution of luminophor and photosensitive material.

To obtain these differently colored vertical stripes, the optical system is shifted horizontally. Since the screen is illuminated by means a mask 3, perforated with elongated slits 4 in the vertical direction, the result thereof is that each vertical stripe 2 is not illuminated uniformly throughout its height and, therefore, does not have a constant width. In particular, narrowings or contractions 9 appear at those places of the screen which correspond to the spaces 10 between the slits 4 of the mask. Furthermore, this effect varies according to the position on the screen, namely the inclination of the UV rays with respect to the perpendicular direction to the center of the screen.

It is desirable for the vertical stripes to be as uniform as possible throughout the surface of the screen. To obtain this uniformity, there is provision, during each illumination step after the deposition of a luminophor, for shifting the optical system 5, including the UV source 6, vertically with reference to the screen or the UV source, or again for applying this shift to the diaphragm 8 alone.

It is desirable for the vertical stripes to be as uniform as possible throughout the surface of the screen. To obtain this uniformity, there is provision, during each illumination step following a deposition of a luminophor, for modifying the illumination of the screen so as to shift the projected image of the mask vertically. This can be obtained in different ways, such as the shifting of the optical system 5 with respect to the envelope/mask set, or conversely.

For reasons of convenience and ease of implementation, it is preferable to shift the optical system 5 vertically with respect to the envelope/mask set. In an illumination operation of this type, comprising a vertical movement of the optical system, it is important that there should be no local heterogeneity of light energy due to the shadows caused by the opaque parts between the slits 4 of the mask 3, and this leads to the use of a diaphragm 8, the aperture of which has a defined shape. Thus, the vertical height V of the aperture varies as a function of the x and y coordinates of the point to be eliminated.

A vertical shift of this type, with a determined value associated with a determined diaphragm aperture, gives good results but it is not possible to obtain optimum definition and uniformity of the luminophor stripes.

An aim of the present invention, therefore, is the implementation of a method for the illumination of the different luminophor stripes that makes it possible to obtain definition and uniformity of the luminophor stripes as close as possible to the optimum values.

Another aim of the present invention is also the making of a diaphragm which can be used to implement said illumination process.

Another aim of the present invention is to determine the aperture of the diaphragm.

SUMMARY OF THE INVENTION

The invention refers to a method for the illumination of a mask type color television tube screen, during its manufacture, wherein the deposition of a solution of a luminescent substance and a photosensitive substance is followed by an operation to dry the deposited layer and an operation to illuminate this layer, through the mask and through an optical system with diaphragm, by a source of a radiation to which the photosensitive substance is sensitive, a method wherein, during the operation to illuminate each layer of luminescent substance, the shape of the aperture of the diaphragm of the optical system is modified so as to obtain radiation having different angles of incidence with respect to the mask and, thus, so as to uniformly illuminate the vertical stripes, on the screen, corresponding to a defined color.

The invention also refers to a diaphragm of an optical system used for the illumination of the screen of a color television tube according to the above method, said diaphragm comprising:

a plurality of strips juxtaposed in parallel to the vertical stripes to be obtained and arranged perpendicularly to the radiation, and, means to shift the strips in a direction parallel to the vertical stripes and independently of one another, so as to obtain determined aperture shapes.

In another embodiment of the diaphragm, the strips can be replaced by elementary diaphragms which are juxtaposed in the direction of the radiation perpendicular to the mask, each elementary diaghragm being used to define a determined part of the profile of the aperture.

BRIEF DESCRIPTION OF THE DRAWINGS

Other features and advantages of the present invention will appear from the following description, made with reference to the appended drawings, of which.

Figure 6:
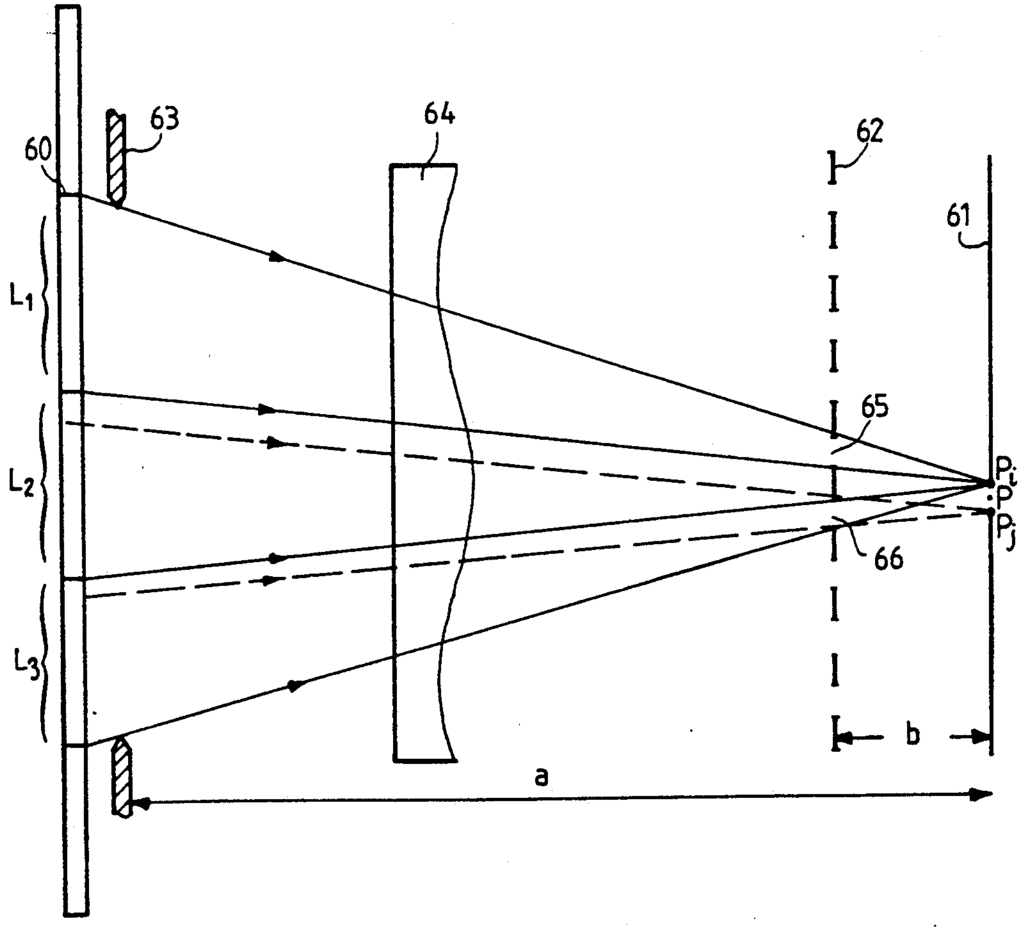

FIGS. *2a* and *2b* respectively show front and side views of a particular embodiment of a diaphragm according to the invention;

FIGS. *3a* to *3d* show front views of elementary plates and their joining with a view to making a diaphragm according to the invention;

FIGS. *4a* and *4b* show different aperture shapes for the diaphragm according to relative positions of the elementary plates;

FIG. 5 is a drawing of a device for shifting elementary plates to obtain the desired diaphragm aperture, and, FIG. 6 is an optical graph used to determine the elements for computing the aperture of the diaphragm.

DESCRIPTION OF PREFERRED EMBODIMENTS

Figure 1:
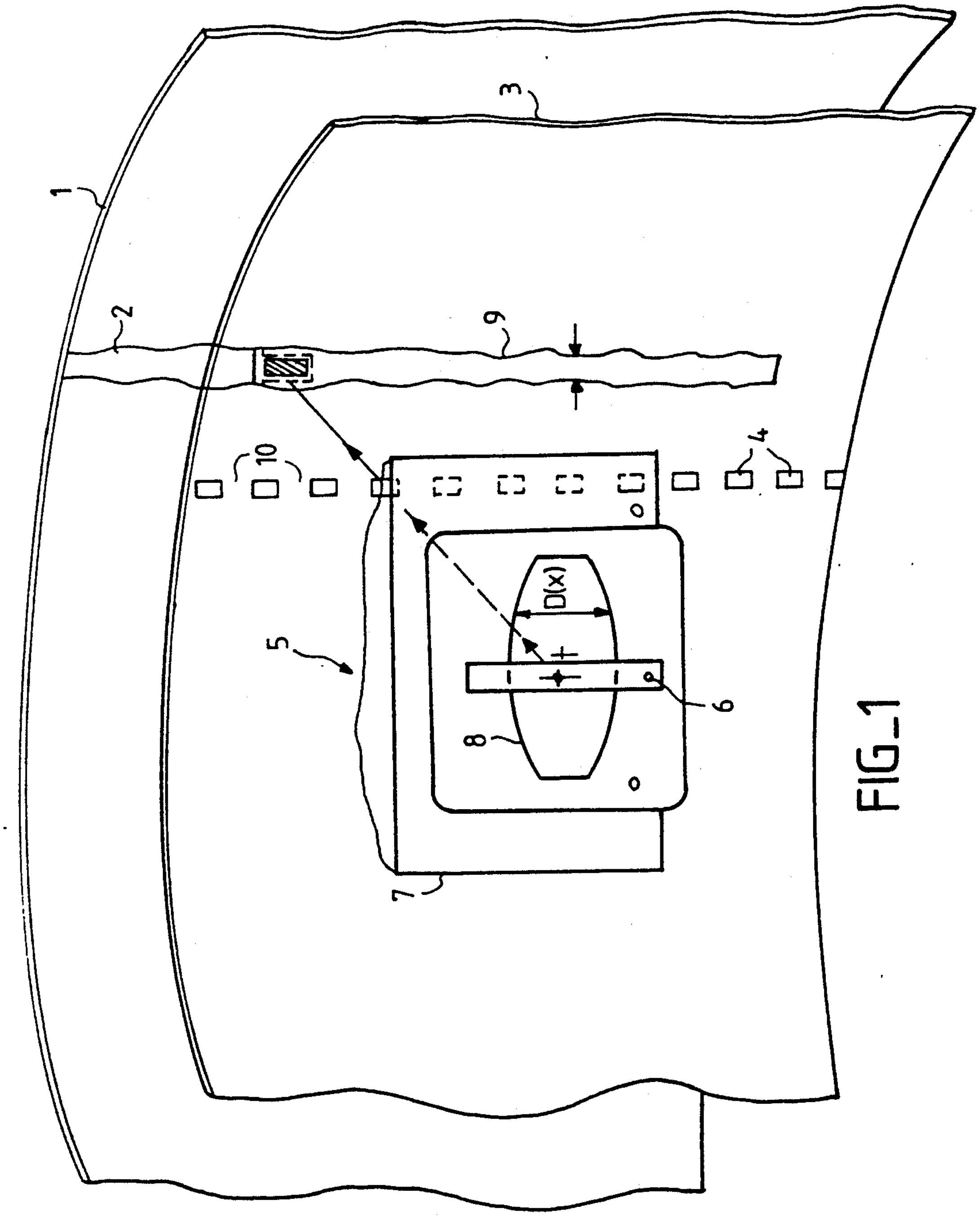
FIG. 1 is a drawing in perspective, showing a screen and a mask of a color television tube during the manufacture of the screen.

FIG. 1, described in the introduction, was used, firstly, to give a brief description of the method for obtaining vertical stripes 2 on the screen, and, secondly, to show the defects in the screen, entailed by said method as applied at present.

To obtain higher definition as well as greater uniformity of the vertical stripes, the invention proposes to modify the aperture of the diaphragm not only as a function of the distance x but also as a function of the vertical shift y. In other words, the aperture of the diaphragm is modified to obtain, at the same time, a variation along the x axis as well as a shift of the diaphragm along the y axis, this shift being variable as a function of the distance x.

FIG. 2 gives a schematic view of an embodiment of a diaphragm 16 of this type with a variable aperture 17, in using two series 10 and 11 of thin strips 12 and 13, juxtaposed in parallel to the vertical stripes to be obtained, each strip being designed to move vertically along the y axis. The shift of the strips 12, 13, can be obtained by micrometer screws (not shown) driven by motors (not shown). To restrict the number of driving motors, it is possible to take into account the fact that the aperture of the diaphragm is symmetrical with that of the y axis, so that one and the same motor can control two strips 12, 14, or 13, 15 of one and the same series, which are deposited symmetrically with respect to this y axis.

With a device of this type, having strips juxtaposed in parallel to the vertical stripes to be obtained, it is clear that the greater the number of strips, the higher will be the precision in the shape of the aperture 17, and the result thereof will then be a better result with respect to definition and uniformity of the vertical stripes of luminophors.

FIG. 3 gives a schematic view of another embodiment of a diaphragm of this type with a variable aperture, with the superimposition of several elementary diaphragms having aperture shapes which are different but complementary when superimposed. Furthermore, the symmetry of the aperture with respect to the vertical axis is taken into account. To make it easier to understand, FIG. 3 shows a device with three elementary diaphragms, but it is clear that a substantial improvement in definition and uniformity can be obtained only by using at least about ten elementary diaphragms. The role assigned to the elementary diaphragm 20 of FIG. *3a* is to obtain the diaphragm in its middle part, while the role assigned to the elementary diaphragm 22 of FIG. *3c* is to obtain the diaphragm at both its ends. Finally, the roled assigned to the elementary diaphragm 21 is to obtain the intermediate part of the diaphragm. If the three elementary diaphragms 20, 21 and 22 are superimposed as shown in the perspective view of FIG. *3d*, a diaphragm 23 is obtained with an aperture 24 of the indicated shape, if the three corners 25, 26 and 27 of each elementary diaphragm are made to coincide.

It will be understood, then, that if the elementary diaphragms 20, 21 and 22 are shifted in the direction of the arrow 28, the shape of the aperture is modified as shown in FIG. *4a*. To obtain the shape of the aperture of FIG. *4b*, the elementary diaphragms are shifted in the direction of the arrow 29. The aperture shape to be got will be obtained all the more efficiently as the number of elementary diaphragms is high and, in this case, the shape of the determining edges 30, 31 and 32 will have less effect on the final shape.

As for the strips of FIG. 2, the shifting of the elementary diaphragms 20, 21, 23 can be obtained by micrometer screws driven by motors.

FIG. 5 gives a schematic view of an embodiment of a complete diaphragm according to the invention. It comprises, for example, six elementary diaphragms 40 to 45 placed behind each other on a frame 46. Each elementary diaphragm is connected to a micrometer screw such as the one referenced 47 (FIG. *5b*), the rotation of which will cause the vertical shift of the associated elementary diaphragm. The rotation of the micrometrical screws is obtained by motors such as the one referenced 48. The stopping of these motors is controlled by an electronic circuit 49 associated with a microprocessor 50.

FIG. 6 is a simplified optical graph showing the path of rays coming from UV source 60 and illuminating the screen 61 through a mask 62, after having crossed a diaphragm 63 and an intermediate optical device 64. The following explanations are aimed at showing the mode of computation of the diaphragm aperture and of its modification to obtain greater uniformity of illumination of the vertical stripes. A point P of the screen 61 is illuminated by the lamp 6 through the diaphragm 61 of the optical device 64 and the slits 65 and 66 of the mask. More precisely, in the immediate vicinity of the point P, the point Pi is illuminated, firstly, by the length L1 of the lamp 60 via the slit 65 and, secondly, by the part L3 of the lamp via the slit 66. Furthermore, the point Pj is illuminated by the length L2 of the lamp via the slit 66. To have uniformity of illumination at Pi and Pj, it will be understood that it is necessary to obtain the equation $L2=L1+L3$ for a lamp with uniform illumination throughout the length limited by the diaphragm.

If the position of the point P on the screen in the plane of FIG. 6 is changed, i.e. for example along a vertical line, it is understood that the above equation cannot be met, as a first approximation, unless the aperture D of the diaphragm is modified vertically. It is thus possible to determine several values of D for different positions of the point P, and a mean D(x) is computed for a determined x axis. This same computation can be made for different values of x so as to obtain the profile sought.

All these computations are performed by means of a suitable programmed computer: the program used takes into account the presence of the optical device 64 and the slits of the mask 62.

The profile of the diaphragm, which was computed according to the method briefly described above, is a mean value, and therefore corresponds to a compromise which does not ensure the desired uniformity of illumination.

According to the invention, it is proposed to obtain this uniformity of illumination in shifting each strip or elementary diaphragm of the resultant diaphragm by a certain value Yd along the y axis. This value is variable from one strip to the next one.

One method for computing Yd consists in observing that, on the screen, the role of the points Pi and Pj is permutated between two extreme positions with a distance between them that corresponds to the half pitch of the slits on the mask that have given rise to Pi and Pj. It will be understood then that, if the screen/mask set is shifted by a distance Yp with respect to the optical system, the distance PiPj will have received the same luminous flux during this trajectory. For other pairs of points Pi, Pj of the same vertical strip, the shift tó be made is different because the paths of the light rays are different. It is therefore proposed to compute several values of Yp per vertical stripe, and to compute the arithmetical mean Yp therefrom.

It is also proposed to perform the same computations for other vertical stripes, namely for other values of the x axis, thus making it possible to obtain other mean values Yp (x).

Since these mean values correspond to shifts of the screen/mask set, they should be transformed into values for the shifting of the strips or elementary diaphragms which are given by:

$$Yd(x)=Yp(x).(a-b)/b$$

where a is the distance between the diaphragm and the screen and b is the distance between the screen and the mask.

What is claimed is:

1. In a method for the illumination of a stripe screen of a mask type color television tube, during its manufacture, wherein said method includes the deposition of a solution of a luminescent substance and photosensitive substance in a layer which is followed by an operation to illuminate said layer through a slit- apertured mask of the tube, the illumination of said layer being by a linear source of radiation to which the photosensitive substance is sensitive, wherein the image of said linear source at the screen is limited by a diaphragm located adjacent to said source, said diaphragm having a single aperture therein, said deposition of a solution and said illumination being repeated for a plurality of different color-emitting luminescent substances, the improvement comprising modifying the shape of said diaphragm aperture for each different color-emitting luminescent substance to obtain illumination having different angles of incidence with respect to said mask, the modification of the diaphragm associated with a particular screen stripe being made on the basis of a mean value which is calculated to provide equal illumination at two extreme points that are respectively associated with two consecutive mask slits that are associated with the particular screen stripe, the mean value being computed to ensure that each distance, equal to the distance between said two extreme points, along the same screen stripe receives the same illumination luminous flux.

2. The method as defined in claim 1, wherein said diaphragm aperture is modified by shifting parallel strips relative to each other, said strips being part of said diaphragm.

3. The method as defined in claim 1, wherein said diaphragm aperture is modified by moving parallel plates relative to each other, each of said plates including a different shaped aperture therein.

4. In a method for the illumination of a screen of a color television tube during its manufacture, said tube including a mask adjacent to said screen, said mask having vertically elongated slits therein, said method including, for each of three luminescent colors, the deposition of a solution of a luminescent substance and a photosensitive substance in a layer on said screen, the deposition being followed by an operation to illuminate said layer through the mask and through an optical system with diaphragm from a source of radiation to which the photosensitive substance is sensitive, the improvement comprising during the operation to illuminate each layer of luminescent substance for each of the three luminescent colors, the shape of the aperture of the diaphragm of the optical system is modified so as to obtain radiation having different angles of incidence with respect to the mask to uniformly illuminate vertical stripes on the screen, corresponding to a defined color.

5. A method according to claim 1, wherein:

the modification of the aperture of the diaphragm is made on the basis of a mean value which is computed for each value of the x axis so as to obtain equality of illumination of the pairs of extreme points, Pi and Pj, each associated with two consecutive slits of one and the same vertical stripe, and the value of this modification is computed so that each distance PiPj receives the same luminous flux irrespectively of the position of the pairs of points Pi, Pj on the vertical stripe.

* * * * *